Patented May 20, 1952

2,597,329

UNITED STATES PATENT OFFICE 2,597,329

PROCESS FOR ANION EXCHANGE OF THIAMIN SALTS

Eugene E. Howe, Bound Brook, and Max Tishler, Westfield, N. J., assignors to Merck & Co., Inc., Rahway, N. J., a corporation of New Jersey No Drawing. Application August 6, 1947, Serial No. 766,890

11 Claims. (Cl. 260—256.6)

This invention is concerned, generally, with the preparation of salts of vitamin $B_1$; more particularly, it relates to the inter-conversion of thiamin salts utilizing anion-exchange synthetic resins.

Vitamin $B_1$ is usually synthesized by processes which result in the initial production of thiamin bromide hydrobromide. This salt is ordinarily converted to another vitamin $B_1$ salt, suitable for therapeutic use, such as thiamin chloride hydrochloride or thiamin nitrate. This inter-conversion of thiamin salts has been accomplished previously by reacting thiamin bromide hydrobromide with the appropriate silver salt, but the products thus obtained are usually contaminated with silver and require further purification. Moreover, large amounts of silver are employed in such procedures, and the recovery of this silver, and the unavoidable losses of silver which occur, add considerably to the manufacturing cost of vitamin $B_1$.

We have now discovered, that a salt of vitamin $B_1$ with any desired anion is readily prepared in high yield and in substantially pure form from any other vitamin $B_1$ salt. This is accomplished by reacting a solution of said vitamin $B_1$ salt with an anion-exchange synthetic resin containing the desired anion. We ordinarily prefer to conduct the reaction between the vitamin $B_1$ salt and the anion-exchange resin by passing the solution of vitamin $B_1$ salt through a column containing the resin-anion component. This method avoids the use of expensive silver salts, thus avoiding silver contamination of the product, and results in the direct production of a substantially pure product in high yield. A further advantage of this process is that contaminating anions, such as sulfate, and heavy metal cations, such as lead, copper, nickel, and iron, which form complexes with the resin employed, are likewise removed. A special feature of this process is that concentrated vitamin $B_1$ salt solutions can be converted without appreciable losses due to vitamin adsorption by the resin.

Although our novel and improved process is generally applicable for the inter-conversion of vitamin $B_1$ salts, it is ordinarily employed for treating hydrohalic acid salts of vitamin $B_1$ and, in particular, for preparing thiamin chloride hydrochloride, the nitric acid salt of thiamin nitrate, the acetic acid salt of thiamin acetate, and the like, from thiamin bromide hydrobromide.

Resinous materials containing basic groups, such as amino groups, are employed as the anion-exchange resin. It is ordinarily preferred to employ resins of the phenol-formaldehyde type which are chemically or structurally characterized by the presence of aminoalkylene aminomethyl substituents on the phenyl nuclei. (A commercially available resin of this type, which can be prepared as described in Example 4 of U. S. Patent 2,402,384, which issued on June 18, 1946, is sold by the Resinous Products and Chemical Company under the trade name of Amberlite IR–4b.)

The resin-anion component may be prepared by passing a solution containing the desired anion through a bed of the resin in a column, and then washing the resin with water to remove unreacted solution from the column. The reaction between the resin and anion is best carried out using the corresponding acid, as for example, hydrochloric acid. This procedure avoids the introduction of undesired cations. Moreover, the initial use of an acid is necessary in the case of certain hydroxyl, and carbonate resins, since these resins are often non-reactive with neutral solutions, such as sodium chloride. However, it is often desired to prepare resin-exchangers containing anions of weak acids, such as acetate ion, or containing anions of oxidizing acids to which the resin is unstable, such as nitrate anion. The preparation of such resin-exchangers is ordinarily accomplished by first preparing the resin-chloride, and then reacting said resin-chloride with a solution containing a salt of the desired anion, i. e. sodium nitrate, sodium acetate, and the like. By this procedure, the nitrate or acetate ion, replaces the chloride anion to produce the corresponding resin-nitrate or resin acetate, respectively, and the chloride ion is transferred to the effluent in the form of sodium chloride.

After the resin-anion component has been prepared, an aqueous solution of the vitamin $B_1$ salt which is to be converted is passed through the column containing said resin at a suitable rate to achieve as complete conversion as possible. It is possible to operate the column using solutions containing extremely low concentration of vitamin $B_1$. It is ordinarily preferred, however, to employ aqueous solutions in which the concentration of vitamin $B_1$ salt is about 20–25%.

The capacity of the resin for converting vitamin $B_1$ salt such as thiamin bromide hydrobromide, without any break-through of the bromide ion, is then determined experimentally, e. g. in the case of the Amberlite IR–4b resin described above, the total capacity of the resin-chloride obtained from 100 gms. of dried resin is about 87 gms. of thiamin bromide hydrobromide. Employing a 10 in. column containing resin-chloride prepared from 100 gms. of dried resin, the break-through of bromide ion, occurs after about 75 gms. of thiamin bromide hydrobromide has been converted. By regulating the amount of vitamin $B_1$ salt passed through the column, it is possible to completely convert said vitamin $B_1$ salt at a single pass, the holdback in the column being recovered by washing the column with distilled water. The vitamin $B_1$ salt thus produced is recovered from the aqueous effluent by conventional means, as, for example, by concentrating the solution and precipitating said vitamin $B_1$ salt by the addition of alcohols, such as isopropanol.

In technical operation, however, it is preferred to take as large a first cut of converted vitamin $B_1$ salt solution, free of starting anions, as possible, and the vitamin $B_1$ salt is recovered from this aqueous solution as previously described. The column is then washed with water, and the resulting effluent, which contains a mixture of starting and final salts of vitamin $B_1$, is utilized as starting solution for the next run of the column. The resin column, which, at this point, is substantially saturated with the starting anion, is again treated with a solution of the desired anion as described above. The resin column is washed with water as in the first cycle to remove unreacted solution from the column. The column is then ready for converting additional vitamin $B_1$ salt.

The following examples illustrate methods of carrying out the present invention, but it is to be understood that these examples are given by way of illustration and not of limitation.

Example 1

Ten grams of Amberlite IR-4b (an anion exchange resin manufactured by the Resinous Products and Chemical Company, and which is prepared as described above), was treated in a beaker with 100 cc. of 10% hydrochloric acid. When evolution of carbon dioxide had almost ceased, the hydrochloric acid was removed by decantation and the resin was placed in a 10 mm. glass tube forming a column 10 inches in height. 100 cc. of 5% hydrochloric acid was then passed through the column at the rate of 2 cc. per minute and this was followed by about 50 cc. of distilled water until the effluent gave only a slight test for chloride.

A solution of 6.0 gms. of thiamin bromide hydrobromide in 20 cc. of water was passed through the column of resin, prepared as described above, at the rate of 0.5 cc. per minute. This solution was followed by 25 cc. of water at the same rate. The combined effluent and wash was decolorized by treatment with 0.2 gms. of activated charcoal and evaporated to a volume of 12 cc. 145 cc. of isopropanol was added to the resulting solution, after which the aqueous-isopropanol mixture was cooled to 5° C. and held at that temperature overnight. The precipitated thiamin chloride hydrochloride was recovered by filtering, washed with 25 cc. of isopropanol and dried to constant weight at 60° C., to produce 4.0 gms. of substantially pure material. The mother liquor was reconcentrated and a second crop of 0.2 gms. was obtained therefrom, which resulted in an overall yield of 4.2 gms., 88.7% of theory; M. P. 237-238° C. A fluorescein spot test indicated less than 0.1% contamination with thiamin bromide hydrobromide.

Example 2

5.0 gms. of vitamin $B_1$ hydrochloride was dissolved in 25 cc. of water and passed through a column of resin which had previously been used for the conversion of the hydrobromide to the hydrochloride; (the resin column employed thus contained resin-bromide). The effluent was found to contain no ionic chloride indicating a complete reversal of the exchange reaction carried out in Example 1.

Example 3

The procedure described in Example 1 was followed, except that soluble salts (nitrates) of copper, lead, nickel and iron were added to the vitamin $B_1$ hydrobromide solution. The metals were present in the following concentrations: copper—600 p. p. m. (parts per million), lead—800 p. p. m., nickel—500 p. p. m., and iron—400 p. p. m. The copper, lead, and nickel content of the isolated thiamin chloride hydrochloride was approximately 75 p. p. m., while the iron content was less than 20 p. p. m.

Example 4

About 12 gms. of Amberlite IR-4b was treated with aqueous hydrochloric acid substantially as described in Example 1 to produce a column of resin-chloride substantially 12 inches in height in a glass tube approximately 10 mm. in diameter. About 100 cc. of aqueous 5% sodium nitrate solution was then passed through the column at a rate of approximately 2 cc. per minute, followed by approximately 50 cc. of water. (A nitrate salt must be used for the preparation of the column, since Amberlite IR-4b is unstable to nitric acid. Moreover, the resin must first be reacted with an acid, since the hydroxyl and carbonate groupings of the resin are non-reactive with neutral sodium nitrate.)

A 20% aqueous solution of thiamin bromide hydrobromide was passed through the column, prepared as described above, at a rate of approximately 0.5 cc. per minute. The breakthrough of bromide ion occurred after the passage of solution containing approximately 50 gms. of thiamin bromide hydrobromide per 100 gms. of dried resin. The total capacity of the resin was found to be approximately 110 gms. of thiamin bromide hydrobromide per 100 gms. of dried resin.

Example 5

A 20% solution of thiamin bromide hydrobromide was passed through a column, packed to a depth of approximately 20 inches with resin-nitrate prepared as described in Example 4 from about 26 gms. of dried Amberlite IR-4b. The rate of flow was again 0.5 cc. per minute, so that the contact time was approximately doubled. The effluent solution, collected before the breakthrough of bromide ion, was titrated with N/10 sodium hydroxide solution using phenolphthalein as an indicator. This titration indicates that resin-nitrate prepared from 100 gms. of dried resin converts about 52 gms. of thiamin bromide hydrobromide to the nitrate before the breakthrough of bromide ion.

Example 6

About 10 gms. of dried Amberlite IR-4b (as shipped) was placed in a 10 mm. glass column, thus forming a resin column approximately 10 inches in height. Approximately 100 cc. of 5% aqueous hydrochloric acid was passed through this column at a rate of approximately 2 cc. per minute, followed by approximately 200 cc. of 5% aqueous sodium acetate solution, also at a rate of approximately 2 cc. per minute, and the column was then washed with about 50 cc. of distilled water. A 5% aqueous solution of thiamin bromide hydrobromide was then passed through the column at a rate of approximately 0.5 cc. per minute; the break-through of bromide ion occurred after approximately 7.50 gms. of thiamin bromide hydrobromide had been converted. After approximately 12.5 gms. of vitamin had been fed into the column, the bromide ion concentrations of the original and effluent solution were substantially equal. A total of 10.0 gms. of the hydrobromide was converted to the acetic acid salt of thiamin acetate. The pH of the original solution was 4.1 and that of the effluent prior to the break-through of bromide ion was approximately 5.4. The acetic acid salt of thiamin monoacetate may be recovered from this effluent by conventional means. Modifications may be made in carrying out the present invention without departing from the spirit and scope thereof and the invention is to be limited only by the appended claims.

We claim:

1. The process of preparing a salt of vitamin $B_1$ which comprises reacting an aqueous solution containing another salt of vitamin $B_1$ with a polyamine-formaldehyde anion-exchange synthetic resin, said resin containing the same anion as the salt which it is desired to produce, whereby an anion exchange takes place between said salt of vitamin $B_1$ and the anion of the synthetic resin to produce the desired salt of vitamin $B_1$, separating the aqueous solution containing said vitamin $B_1$ salt from said resin, and recovering said vitamin $B_1$ salt from said solution.

2. The process of preparing a salt of vitamin $B_1$ which comprises reacting an aqueous solution containing a hydrohalic acid salt of vitamin $B_1$ with a polyamine-formaldehyde anion-exchange synthetic resin, said resin containing the same anion as the salt which it is desired to produce, whereby an anion exchange takes place between said hydrohalic acid salt of vitamin $B_1$ and the anion of the synthetic resin to produce the desired salt of vitamin $B_1$, separating the aqueous solution containing said vitamin $B_1$ salt from said resin, and recovering said vitamin $B_1$ salt from said solution.

3. The process of preparing an aqueous solution containing a salt of vitamin $B_1$ substantially free of contaminating anions, and cations of heavy metals, from an aqueous solution containing another salt of vitamin $B_1$ together with said ionic impurities, which comprises reacting said aqueous solution with a polyamine-formaldehyde anion-exchange synthetic resin, said resin containing the same anion as the salt which it is desired to produce, thereby producing the desired salt of vitamin $B_1$ and at the same time removing said contaminating ions, and separating the aqueous solution containing said vitamin $B_1$ salt from said resin.

4. The process of preparing thiamin chloride hydrochloride which comprises reacting an aqueous solution containing thiamin bromide hydrobromide with a polyamine-formaldehyde anion-exchange synthetic resin containing chloride anion, whereby an anion exchange takes place between said thiamin bromide hydrobromide and the resin-chloride to produce thiamin chloride hydrochloride, separating the aqueous solution containing said thiamin chloride hydrochloride from said resin, and recovering said thiamin chloride hydrochloride from said solution.

5. The process of preparing the nitric acid salt of thiamin nitrate which comprises reacting an aqueous solution containing thiamin bromide hydrobromide with a polyamine-formaldehyde anion-exchange synthetic resin containing nitrate anion, whereby an anion-exchange takes place between said thiamin bromide hydrobromide and the resin-nitrate to produce the nitric acid salt of thiamin nitrate, separating the aqueous solution containing said nitric acid salt of thiamin nitrate from said resin, and recovering said nitric acid salt of thiamin nitrate from said solution.

6. The process of preparing the acetic acid salt of thiamin acetate which comprises reacting an aqueous solution containing thiamin bromide hydrobromide with polyamine-formaldehyde anion-exchange synthetic resin containing acetate anion, whereby an anion-exchange takes place between said thiamin bromide hydrobromide and the resin-acetate to produce the acetic acid salt of thiamin acetate, separating the aqueous solution containing said acetic acid salt of thiamin acetate from said resin, and recovering said acetic acid salt of thiamin acetate from said solution.

7. The process of preparing a salt of vitamin $B_1$ which comprises passing an aqueous solution, said solution having a pH of about 0.5 and containing another salt of vitamin $B_1$ in a concentration of about 20% through a column containing a polyamine-formaldehyde anion-exchange synthetic resin, said resin containing the same anion as the salt which it is desired to produce, whereby an anion exchange takes place between said salt of vitamin $B_1$ and the anion of the synthetic resin to produce an aqueous effluent containing the desired salt of vitamin $B_1$ in a concentration of about 20%, and recovering said vitamin $B_1$ salt from said aqueous effluent.

8. The process of preparing thiamin chloride hydrochloride which comprises passing an aqueous solution having a thiamin bromide hydrobromide concentration of about 20% and a pH of about 0.5 through a column packed with a polyamine formaldehyde anion-exchange synthetic resin containing chloride anion, whereby an anion-exchange takes place between said thiamin bromide hydrobromide and the chloride anion of the synthetic resin to produce an aqueous effluent having a thiamin chloride hydrochloride concentration of approximately 20%, and substantially free of thiamin bromide hydrobromide, and recovering substantially pure thiamin chloride hydrochloride from said effluent; passing wash water through said column thereby separating the residual vitamin $B_1$ salts from said resin as an aqueous wash solution, then passing through the column a solution containing chloride anion followed by wash water thereby forming the resin-chloride component, substantially free of contaminating ions, finally passing said aqueous wash solution containing residual vitamin $B_1$ salts through the resin chloride, thereby converting residual thiamin bromide hydrobromide in said wash solution to thiamin chloride hydrochloride, and recovering said thiamin chloride hydrochloride from the aqueous effluent thus produced, and repeating the foregoing cycle.

9. The process of preparing the nitric acid salt of thiamin nitrate which comprises passing an aqueous solution having a thiamin bromide hydrobromide concentration of about 20% and a pH of about 0.5 through a column packed with a polyamine formaldehyde anion-exchange synthetic resin containing nitrate anion, whereby an anion exchange takes place between said thiamin bromide hydrobromide and the nitrate anion of the synthetic resin to produce an aqueous effluent having a concentration of the nitric acid salt of thiamin nitrate of approximately 20%, and substantially free of thiamin bromide hydrobromide, and recovering substantially pure nitric acid salt of thiamin nitrate from said effluent; passing wash water through said column thereby separating the residual vitamin $B_1$ salts from said resin as an aqueous wash solution, then passing through the column a solution containing nitrate anion followed by wash water thereby forming the resin-nitrate component, substantially free of contaminating ions, finally passing said aqueous wash solution containing residual vitamin $B_1$ salts through the resin-nitrate, thereby converting residual thiamin bromide hydrobromide in said wash solution to the nitric acid salt of thiamin nitrate and recovering said nitric acid salt of thiamin nitrate from the aqueous effluent thus produced, and repeating the foregoing cycle.

10. The process of preparing the acetic acid salt of thiamin acetate which comprises passing an aqueous solution having a thiamin bromide hydrobromide concentration of about 20% and a pH of about 0.5 through a column packed with a polyamine formaldehyde anion-exchange synthetic resin containing acetate anion, whereby an anion exchange takes place between said thiamin bromide hydrobromide and the acetate anion of the synthetic resin to produce an aqueous effluent having a concentration of the acetic acid salt of thiamin acetate of approximately 20%, and substantially free of thiamin bromide hydrobromide, and recovering substantially pure acetic acid salt of thiamin acetate from said effluent; passing wash water through said column thereby separating the residual vitamin $B_1$ salts from said resin as an aqueous wash solution, then passing through the column a solution containing acetate anion followed by wash water thereby forming the resin-acetate component, substantially free of contaminating ions, finally passing said aqueous wash solution containing residual vitamin $B_1$ salts through the resin-acetate thereby converting residual thiamin bromide hydrobromide in said wash solution to the acetic acid salt of thiamin acetate, and recovering said acetic acid salt of thiamin acetate from the aqueous effluent thus produced, and repeating the foregoing cycle.

11. The process of preparing thiamin chloride hydrochloride which comprises passing a solution containing chloride ion followed by wash water through a column packed with a polyamine-formaldehyde anion-exchange synthetic resin thereby converting the resin to the chloride cycle, passing an aqueous solution having a thiamin bromide hydrobromide concentration of about 20% and a pH of about 0.5 through said resin column thereby effecting an anion exchange between the thiamin bromide hydrobromide and the resin-chloride to produce an aqueous effluent containing approximately 20% thiamin chloride hydrochloride, passing wash water through the column thereby separating said effluent from said resin, recovering thiamin chloride hydrochloride from said effluent, then passing through the column a solution containing chloride ion followed by wash water thereby reconverting the resin to the chloride cycle substantially uncontaminated with organic and inorganic impurities, and repeatedly carrying out the foregoing anion-exchange and regeneration operations.

EUGENE E. HOWE.
MAX TISHLER.

REFERENCES CITED

The following references are of record in the file of this patent:

UNITED STATES PATENTS

| Number | Name | Date |
|---|---|---|
| 2,151,883 | Adams et al. | Mar. 28, 1939 |
| 2,198,874 | Holmes | Apr. 30, 1940 |
| 2,268,620 | Rigby | Jan. 6, 1942 |
| 2,443,485 | Waksman et al. | June 15, 1948 |

FOREIGN PATENTS

| Number | Country | Date |
|---|---|---|
| 805,092 | France | Nov. 10, 1936 |

OTHER REFERENCES

Appelzweig: J. Am. Chem. Soc., 66, 1990 (1944).

Applezweig et al.: Ind. and Eng. Chem., 38, pp. 576–579 (1946).

Myers: Ind. and Eng. Chem., 35, No. 8, 858–863 (1943).

Englis et al.: Ind. and Eng. Chem., 36, 609 (1944).

Sussman et al.: Ind. and Eng. Chem. 37, 618–624 (1945).